United States Patent
Frederick et al.

(10) Patent No.: US 10,850,710 B2
(45) Date of Patent: Dec. 1, 2020

(54) AUTONOMOUS VEHICLE GLASS CLEANING SYSTEM

(71) Applicant: Toyota Motor Engineering & Manufacturing North America, Inc., Plano, TX (US)

(72) Inventors: Scott L. Frederick, Brighton, MI (US); Scott P. Robison, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 71 days.

(21) Appl. No.: 16/040,094

(22) Filed: Jul. 19, 2018

(65) Prior Publication Data

US 2020/0023814 A1 Jan. 23, 2020

(51) Int. Cl.
| | |
|---|---|
| *B60S 1/52* | (2006.01) |
| *B60S 1/56* | (2006.01) |
| *B60S 1/48* | (2006.01) |
| *G02B 27/00* | (2006.01) |
| *B60R 11/04* | (2006.01) |
| *G01S 17/931* | (2020.01) |

(52) U.S. Cl.
CPC ............. *B60S 1/52* (2013.01); *B60S 1/481* (2013.01); *B60S 1/56* (2013.01); *B60R 11/04* (2013.01); *G01S 17/931* (2020.01); *G02B 27/0006* (2013.01)

(58) Field of Classification Search
CPC combination set(s) only.
See application file for complete search history.

(56) References Cited

U.S. PATENT DOCUMENTS

| | | | |
|---|---|---|---|
| 8,139,109 B2 | 3/2012 | Schmiedel et al. | |
| 8,935,033 B2 | 1/2015 | Saito et al. | |
| 9,415,779 B2 | 8/2016 | Popham et al. | |
| 9,428,194 B2 | 8/2016 | Prokhorov et al. | |
| 2004/0221790 A1 | 11/2004 | Sinclair et al. | |
| 2010/0163079 A1* | 7/2010 | Bettenhausen | B60S 1/52 134/34 |
| 2016/0244028 A1* | 8/2016 | Wakatsuki | G02B 27/0006 |
| 2017/0259788 A1* | 9/2017 | Villa-Real | B60S 1/488 |

FOREIGN PATENT DOCUMENTS

DE 10 2016 006 039 A1 11/2017

* cited by examiner

*Primary Examiner* — Douglas Lee
(74) *Attorney, Agent, or Firm* — Oblon, McClelland, Maier & Neustadt, L.L.P.

(57) ABSTRACT

A glass cleaning system includes: a housing including at least one peripheral sidewalls being substantially perpendicular relative to a side of a vehicle to which the housing is attached, a cover, and a vision system including at least one sensor and processing circuitry, wherein the vision system is disposed in an interior of the housing, the at least one sensor is communicatively coupled to the processing circuitry, and the vision system is configured to be used with the vehicle to detect surrounding objects and determine distances between said objects and the vehicle; a window mounted as the at least one peripheral sidewall of the housing and configured to tilt towards the interior of the housing into an angled orientation and back; a drain duct disposed in the interior of the housing; and at least one spray nozzle.

12 Claims, 10 Drawing Sheets

US 10,850,710 B2

AUTONOMOUS VEHICLE GLASS CLEANING SYSTEM

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Autonomous vehicles employ myriad sensor devices to detect and monitor their surrounding environment. Typical sensor devices can operate based on image capture, stereo vision, radar, and LIDAR, among others. By analyzing visual data, distance measurements, or some combination thereof, these sensor devices construct a map of their immediate world in real-time and help a vehicle autonomously safely traverse nearby obstacles. A housing can be used in protecting the sensor devices from adverse weather or foreign debris. In the event of an obstruction being deposited on the window of the housing, a method to clean the glass is needed in order to restore optimal performance of the sensor device. Washing methods can be prone to leaving residual cleaning solution on surfaces after a cleaning cycle, which leads to the devices not performing optimally when the window of the encasement still has foreign matter or detergent remaining. Therefore, an alternative apparatus and method for cleaning a housing window using techniques to limit residual detergent can help improve reliability and accuracy of said sensor device.

SUMMARY

The present disclosure relates to a glass cleaning system, including: a housing including at least one peripheral sidewalls being substantially perpendicular relative to a side of a vehicle to which the housing is attached, a cover disposed on a side of the housing opposite the side of the vehicle to which the housing is attached, and a vision system including at least one sensor and processing circuitry, wherein the vision system is disposed in an interior of the housing, the at least one sensor is communicatively coupled to the processing circuitry, and the vision system is configured to be used with the vehicle to detect surrounding objects and determine distances between said objects and the vehicle; a window mounted as the at least one peripheral sidewall of the housing and configured to tilt towards the interior of the housing into an angled orientation and back; a drain duct disposed in the interior of the housing, and at least one spray nozzle.

According to an aspect, the glass cleaning system further includes a motor attached to the window configured to tilt the window towards the interior of the housing into an angled orientation and back.

The foregoing paragraphs have been provided by way of general introduction, and are not intended to limit the scope of the following claims. The described aspects, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
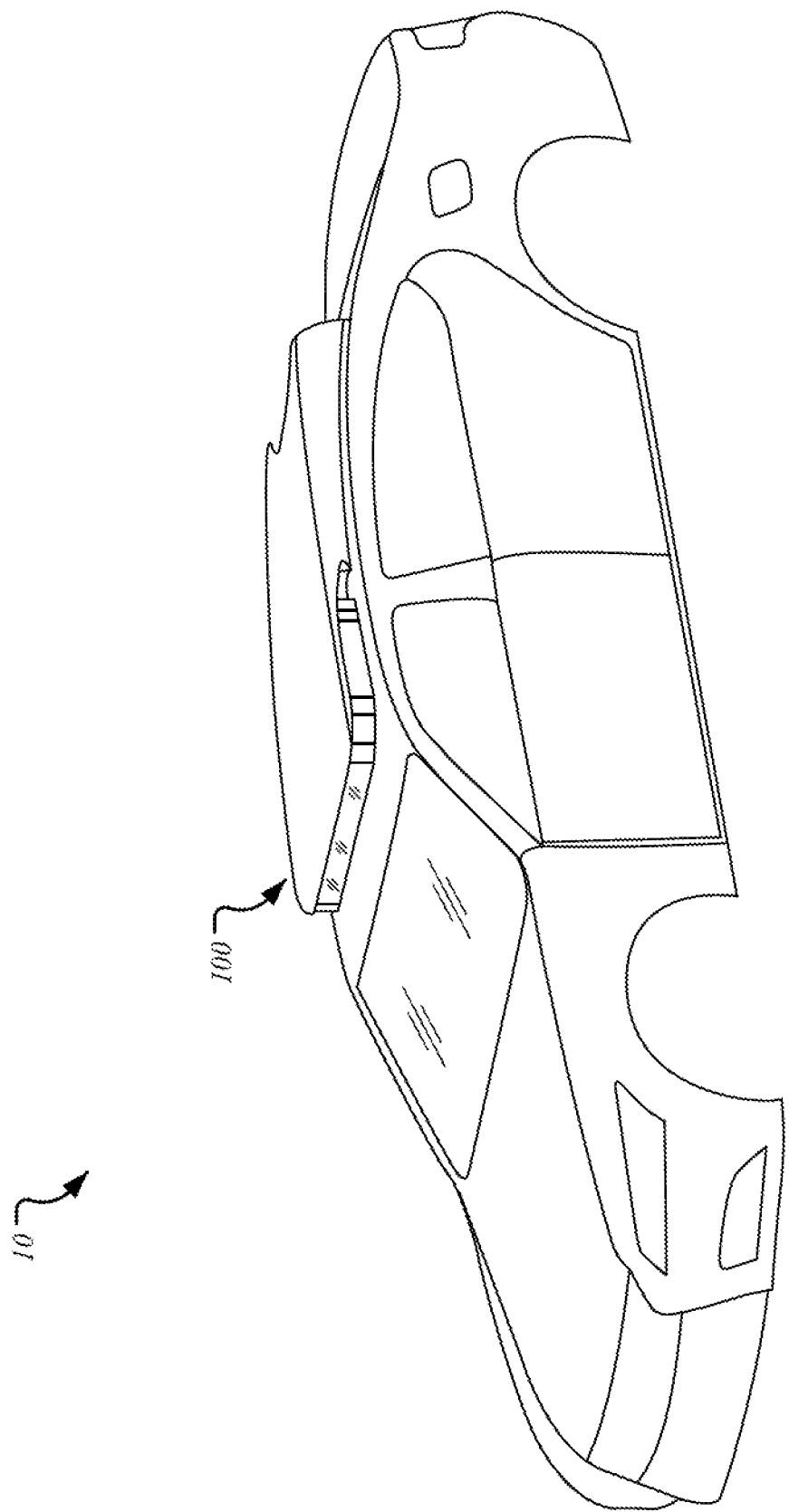
FIG. 1A is a perspective view schematic of a vehicle including a housing for a vision system, according to air exemplary aspect of the present disclosure.

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to at obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "top," "bottom," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Autonomous vehicles rely on a vision system to analyze surrounding objects in order to safely navigate and avoid collisions while on the road. The vision system is often contained in a protective housing to protect the sensitive instruments from damage. Often, the housing becomes soiled from environmental factors, such as dirt and debris. This deposited foreign material erodes the imaging capabilities of the enclosed vision system and requires removal to restore system performance.

A common method of debris removal on vehicles includes physically dislodging the foreign material with a wiper blade being translated across the window using a motor. However, movement of the wiper blade across the window in an intermittent motion can introduce a temporary obstruction to the vision system. Moreover, residual cleaning solution and detergent can be left on the window due to the wiper blade having manufacturing defects or the cleaning pattern of the wiper blade being inefficient in clearing all the cleaning solution and detergent.

Thus, as described herein, the present disclosure describes a system for cleaning the window of a vision system housing wherein the introduction of obstacles during imaging is avoided and the presence of cleaning residue is limited.

FIG. 1A illustrates a perspective view of a vehicle glass cleaning system 10 including a housing 100, according to an exemplary aspect of the present disclosure. The vehicle can be driven by a user inside the vehicle cabin, remotely by a user with a remote control, or the vehicle can be an autonomous vehicle configured to navigate without user-directed steering.

Figure 1B:
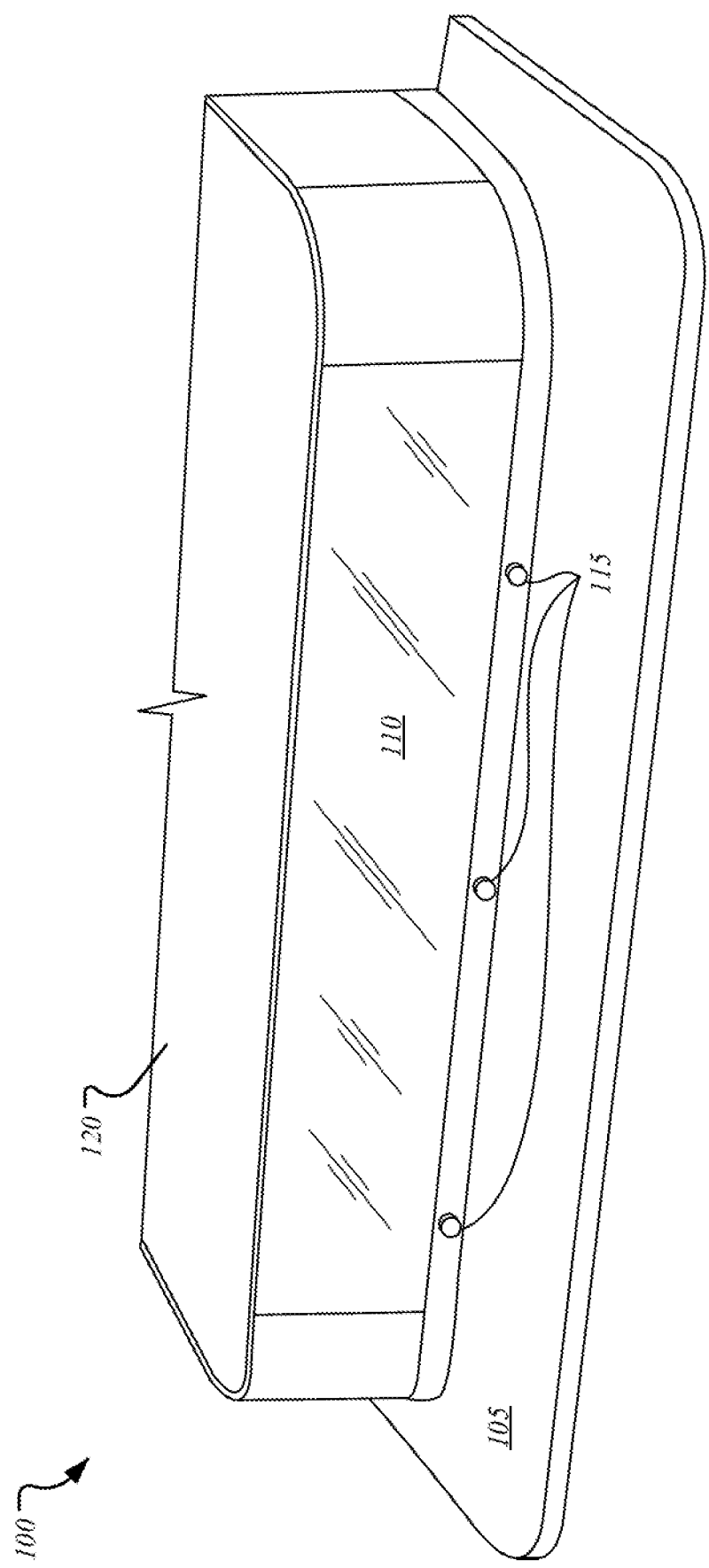
FIG. 1B is a perspective view schematic of the housing in FIG. 1A, according to an exemplary aspect of the present disclosure.
Figure 1C:
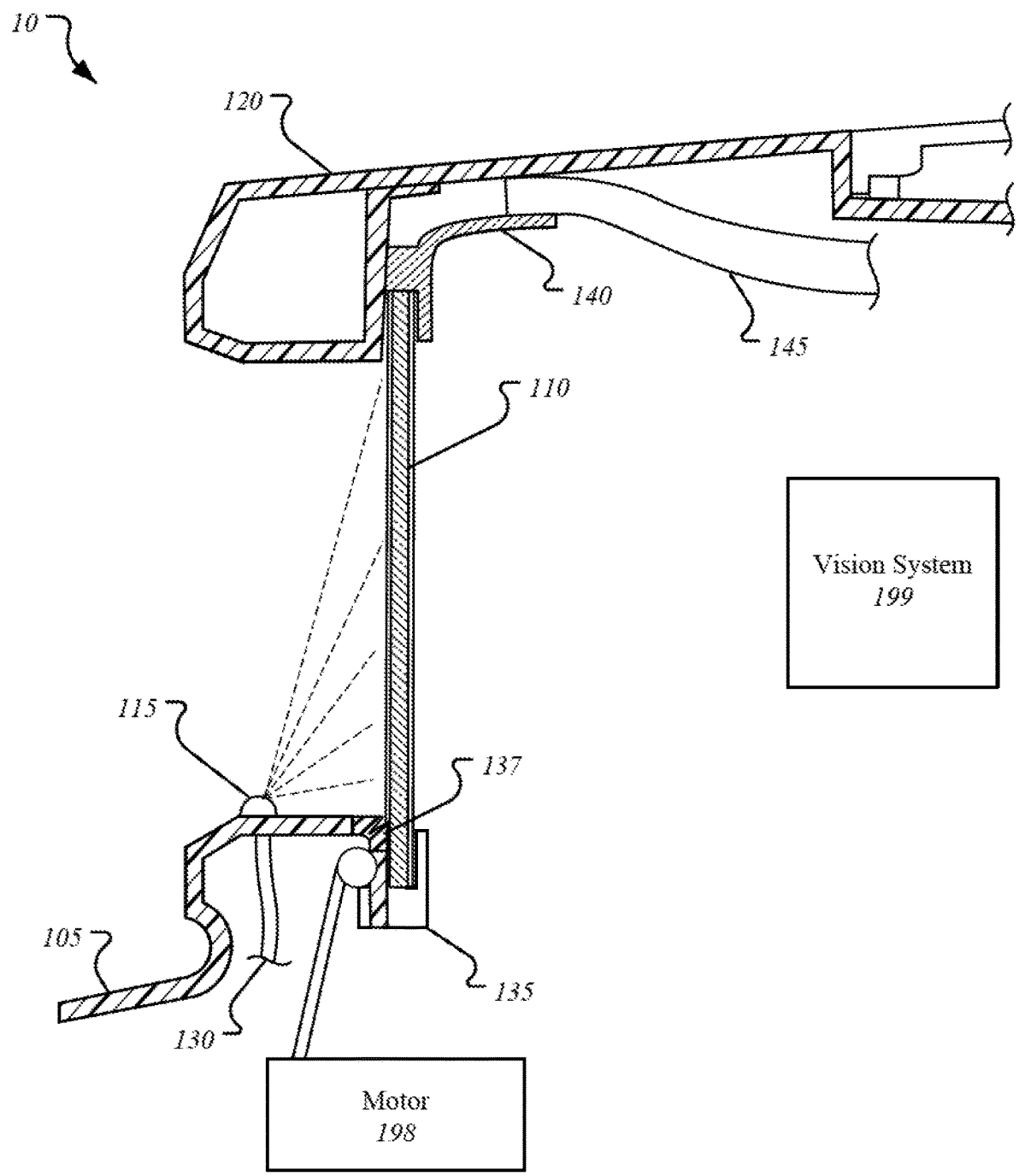
FIG. 1C is a cross-sectional view of the housing in FIG. 1B, according to an exemplary aspect of the present disclosure.

The housing 100 can include a vision system 199 (FIG. 1C). The vision system 199 can include, but is not limited to, one or more types of sensors for imaging and distance determination and processing circuitry configured to analyze said image and distance data. For example, the vision system 199 can include optical cameras configured to capture images. For example, the vision system 199 can include FLIR cameras configured to capture infrared images. For example, the vision system 199 can include a radar system or a LIDAR system configured to determine the distance away from the vehicle of nearby objects. The vision system 199 can be configured to capture and analyze images of the vehicle's immediate surroundings and determine distances to nearby objects in order to safely navigate the vehicle around obstacles.

The housing 100 can be mounted on the roof of the vehicle in order to provide improved lines-of-sight for the vision system 199. In an alternative aspect, the housing 100 can be mounted on a different location or multiple housings can be mounted in multiple locations, such as on a side, on the hood, on the trunk, inside the front grill, inside the front bumper, inside the trunk, or any combination thereof.

FIG. 1B illustrates a perspective view of the housing 100 exterior, according to an exemplary aspect of the present disclosure. The housing 100 exterior includes a base 105, at least one window 110, at least one spray nozzle 115, and a cover 120. The housing 100 shape can be substantially circular, rectangular (as shown), square, or any other shape that permits the vision system 199 a view of the vehicle surroundings. The housing 100 can have windows 110 on one or multiple sides in order to provide more area for the imaging equipment in the vision system 199 to view the environment through. The window 110 can be installed such that the window 110 forms one or more peripheral walls of the housing 100 or the window 110 can be installed in a framed structure of the housing 100. For example, the housing 100 can have elongated window 110 installed on 3 sides of the substantially rectangular shape. The window 110 can be oriented substantially perpendicular relative to the part of the vehicle acting as the anchor for the housing 100 or slightly angled to improve aerodynamics of the vehicle. The window 110 is transparent to the imaging equipment utilized in the vision system 199. For example, the window 110 can be polycarbonate and the imaging equipment utilized can be multiple optical cameras operating in the visible light wavelength region of the electromagnetic spectrum. In another example, the window 110 can be glass and the imaging equipment utilized can be a single LIDAR device with a mechanical mirror operating at a wavelength between 400 to 1550 nm. The window 110 can further include an anti-reflective coating. The window 110 and peripheral sidewalls can be attached to the base 105. It can be appreciated that varying window materials can be chosen depending on the type of vision system 199 utilized.

The cover 120 is disposed opposite to the base 105 and attached to the peripheral walls of the housing 100. The cover 120 forms a water-tight seal with the peripheral walls of the housing 100 and serves as protection for the vision system 199. Non-limiting examples of materials for the cover 120, base 105, and any peripheral wall not formed by the window 110 can include at least one of aluminum, steel, polycarbonate, acrylonitrile butadiene styrene (ABS), polyethylene terephthalate, polyvinyl chloride, polypropylene, nylon, carbon fiber, glass fiber-reinforced resin, metal alloys, and other polymers, or any combination thereof.

FIG. 1C illustrates a side cross-sectional view of the housing 100, according to an exemplary aspect of the present disclosure. The interior of the housing 100 includes at least one fluid tube 130, a window support 135, a window retainer 140, and a drain duct 145.

The at least one spray nozzle 115 is attached to the base 105 and disposed proximally to the window 110 on the exterior. The at least one fluid tube 130 is disposed on a side of the base 105 opposite the at least one spray nozzle 115 and connected to the at least one spray nozzle 115. For example, they can be fluidly connected, or pneumatically connected, or any combination thereof. The at least one spray nozzle 115 receives a cleaning agent from the at least one fluid tube 130 and ejects the cleaning agent onto the window 110. The cleaning agent can be water, cleaning solution with detergent, or cleaning foam. The at least one spray nozzle 115 can also receive a gas from the at least one fluid tube 130 and eject the gas onto the window. The gas can be oxygen, nitrogen, argon, or any other inert gas or mixture of gasses. The at least one spray nozzle 115 can eject the cleaning agent or gas onto the window 110 in a wide angled spraying pattern or a concentrated pattern. The fluid tube 130 can be fed via a pump (not shown) drawing from a container (not shown) of cleaning agent or gas.

The window support 135 is structurally connected to the base 105 via a hinge 137 and configured to hold the window 110 in place along an edge of the window 110 proximal to the base 105. The window support 135 includes a cavity with substantially vertical sidewalls to allow the window to rest inside. The window support 135 can be composed of a material similar to that of the base 105 and cover 120. The hinge 137 adopts a substantially bent shape and can be made of a flexible material, for example rubber, ethylene propylene, or polystyrene. The hinge 137 includes a notched feature to facilitate the hinge opening when the window 110 rotates in a direction that closes the angle along the interior bend of the hinge 137.

The window retainer 140 is attached to an edge of the window 110 proximal to the cover 120 and is configured to form a water-tight seal between the cover 120 and the window 110 as well as between the window 110 and the drain duct 145. The window retainer 140 includes an elongated arm portion that is flexible and conforms to the shape of the duct 145 in order to maintain a water-tight seal during rotation of the window 110. Non-limiting examples of materials for the window retainer 140 include at least one of aluminum, steel, stainless steel, titanium, and metal alloys. During window 110 rotation, the elongated arm portion of the window retainer 140 slides along the exterior surface of the duct 145 and deforms accordingly. Thus, the vision system 199 inside the housing 100 remains sealed from any foreign material. During a cleaning procedure, the foreign material can be routed around the vision system 199 via the drain duct 145. The drain duct 145 can lead to an exit port at the rear of the housing 100.

To initiate the cleaning procedure, the vision system 199 can determine that sufficient foreign material has been deposited on the window 110 to cause a decrease in visibility through the window 110 beyond a predetermined threshold. For example, a LIDAR unit can determine, via processing circuitry, there is deposition of foreign material on the window 110 due to a very short distance reading from the dirt to the LIDAR unit. For example, an optical camera can determine, via processing circuitry, an image is out of focus due to the deposition of foreign material on the window 110. To clean the foreign material, the at least one spray nozzle 115 ejects a cleaning agent at the window 110 with a wide angle spray pattern to coat the entirety of the surface. The foreign material becomes dissolved or suspended in the cleaning agent and forms a mobile slurry and can be cleared from die surface of the window 110.

Figure 2A:
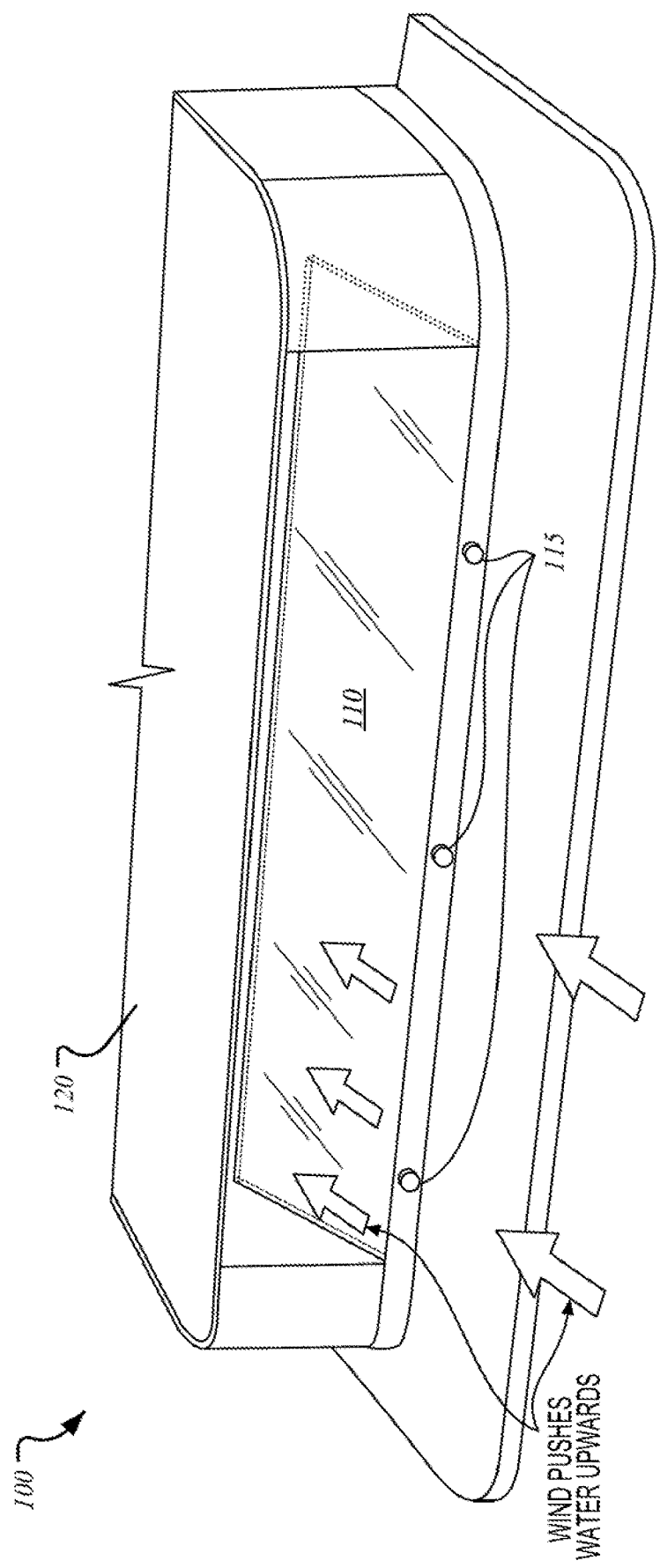
FIG. 2A is a perspective view schematic of the housing in FIG. 1B with the window tilted, according to an exemplary aspect of the present disclosure.
Figure 2B:
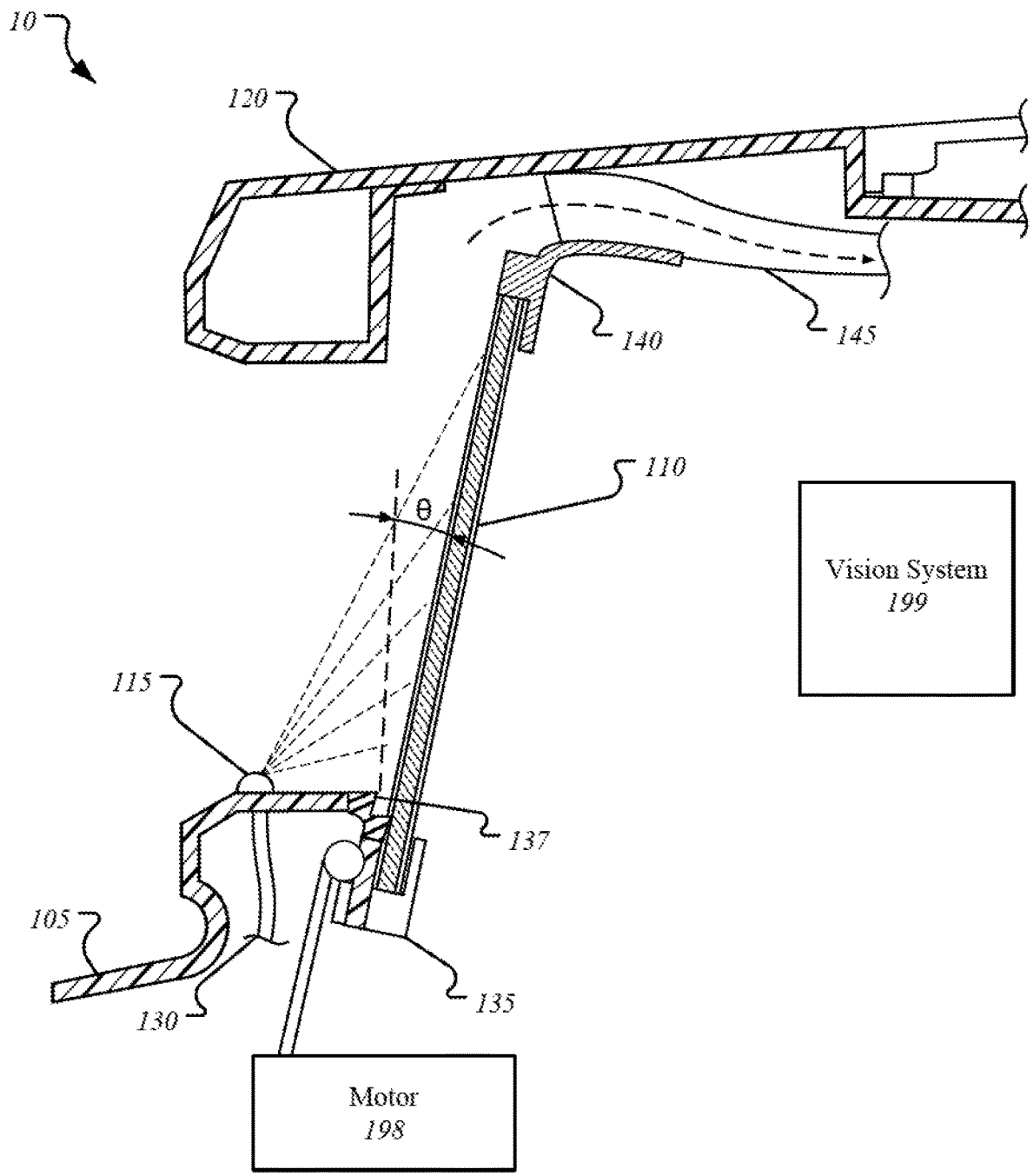
FIG. 2B is a cross-sectional view of the housing in FIG. 2B, according to an exemplary aspect of the present disclosure.

FIGS. 2A-2B illustrate the tilting of the window 110 during a cleaning procedure, according to an exemplary aspect of the present disclosure. The vehicle is in motion and moving in a direction such that air is directed at the exterior surface of the window 110. For example, the window 110 can face the front of the vehicle and the vehicle can be driving forwards in a substantially straight direction. The window 110 can be configured to tilt or rotate towards the interior of the housing 100 to facilitate displacement of the foreign material during the cleaning procedure, wherein the point of rotation occurs at the hinge 137 and the window retainer 140 is translated a distance towards the interior of the housing 100. Tilting the window 110 in conjunction with the upwards force of the air directed at the window 110 while driving promotes the movement of the foreign material and cleaning agent slurry towards the edge of the window 110 disposed proximally to the cover 120. As mentioned previously, since the elongated arm of the window retainer 140 forms a seal with the drain duct 145, the shun y drains into the drain duct 145. The slurry can be carried to the hack of the housing 100 and expelled, or deposited in a reservoir for subsequent filtration and recycling. The tilting of the window 110 is actuated via a motor 198 that is attached to the window support 135. The motor 198 can be at least one of an AC motor and a DC motor. The motor 198 can rotate the window support 135 at the hinge 137 until the window 110 reaches a predetermined angle theta ($\theta$). The vision system 199 can determine that the window 110 has been sufficiently cleaned when visibility has been restored and end the cleaning procedure, wherein the window 110 is rotated in the opposite direction such that the window 110 is not tilted and the seal between the window retainer 140 and the cover 120 is restored. The seal is maintained via the applied force of the motor 198.

Figure 2C:
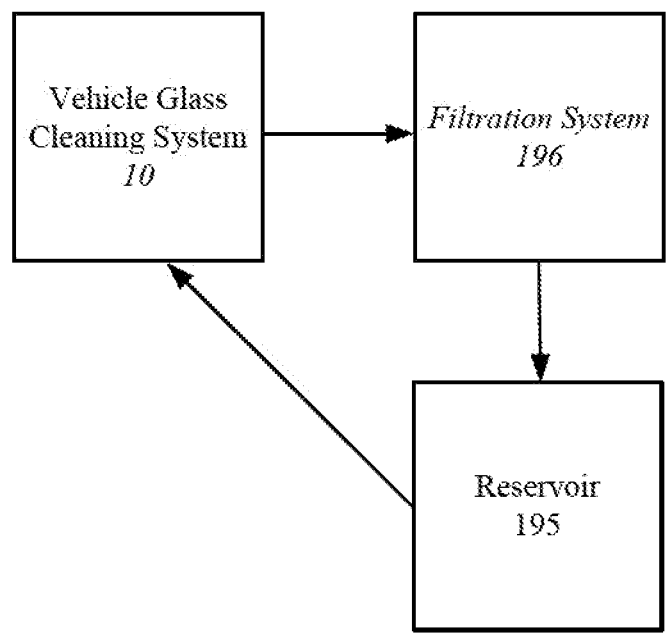
FIG. 2C is a high-level block diagram of a cleaning agent filtration system, according to an exemplary aspect of the present disclosure.

FIG. 2C illustrates a high-level diagram of a filtration system 196 to recycle the cleaning agent, according to an exemplary aspect of the present disclosure. The drain duct 145 can lead to the filtration system 196 where the foreign material is separated from the cleaning agent and the cleaning agent is sent to a reservoir 195 for storage until re-use in the at least one spray nozzle 115. Non-limiting examples of types of filters in the filtration system 196 include at least one of a carbon filter, a charcoal filter, a metal screen filter, a paper filter, a cloth filter, a sediment filter, a ceramic filter, and a reverse osmosis filter.

In another aspect, the at least one spray nozzle 115 ejects gas after ejecting cleaning agent to facilitate the clearing of the slurry when there is insufficient force from the air directed at the rear window 110. For example, the vehicle can be parked, or moving at <30 MPH, or <10 MPH, or <5 MPH. The at least one spray nozzle 115 can eject the gas in a wide angle spray pattern, or the spray nozzle can eject the gas in a concentrated stream. For example, the gas ejected at each spray nozzle 115 can form a flat, wide fan pattern. The flat patterns can be amalgamated to form a substantially continuous stream that substantially spans the length of the window 110 such that a flat line is formed across the window 110. The gas spray pattern can begin at an edge of the window 110 proximal to the base 105 and more towards the edge of the window 110 proximal to the cover 120. This sweeping motion helps push the slurry towards the drain duct 145 and prevent deposition of residual cleaning agent or foreign material.

Advantageously, the tilting of the window 110 in combination with either the wind from the vehicle motion, the ejected gas from the at least one nozzles 115, or both to move the slurry towards the drain duct 145 during the cleaning procedure allow the vision system 199 continuous, unobstructed monitoring of the surroundings.

Figure 3A:
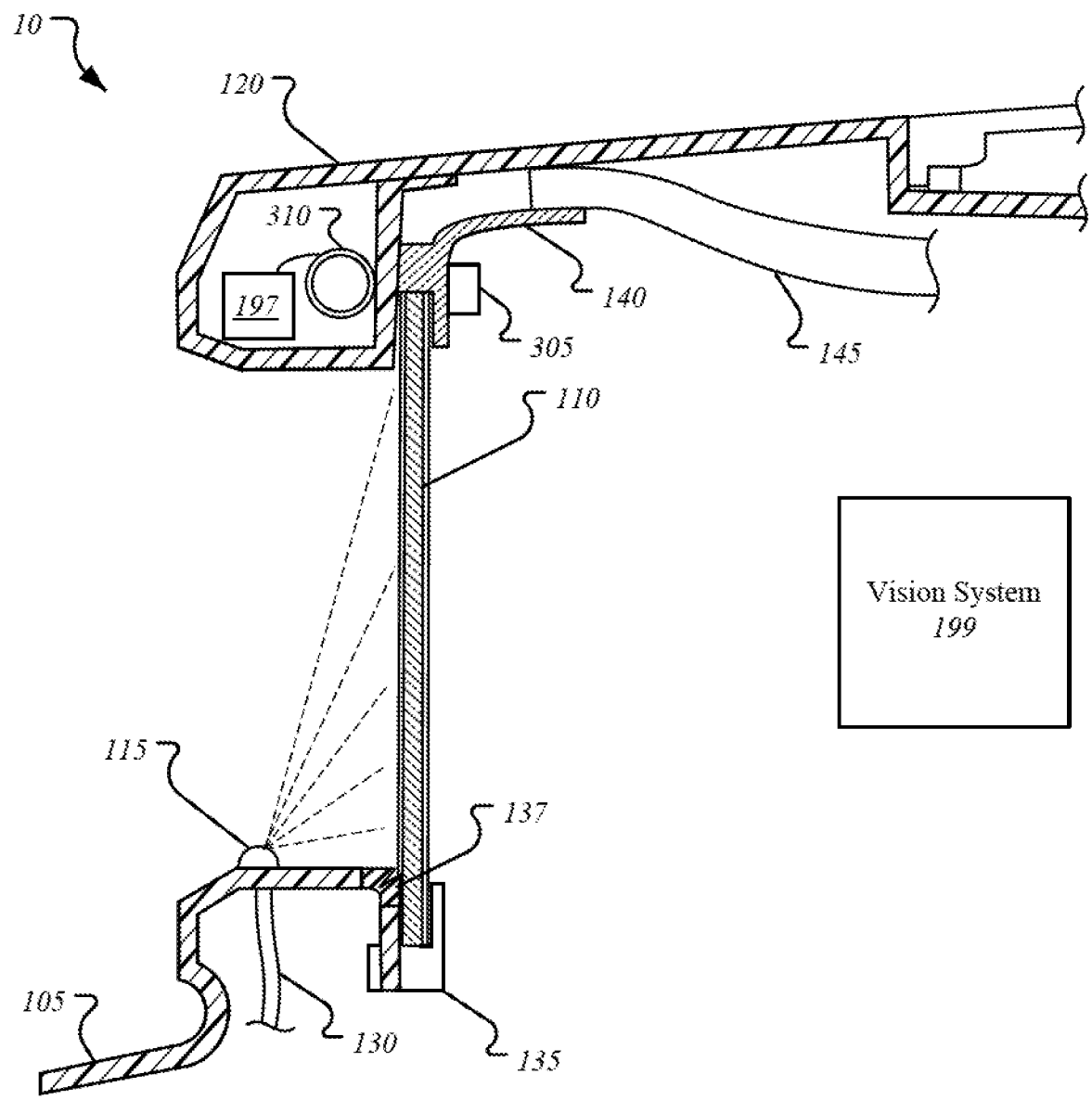
FIG. 3A is a cross-sectional view of the housing in FIG. 1B, according to an exemplary aspect of the present disclosure.
Figure 3B:
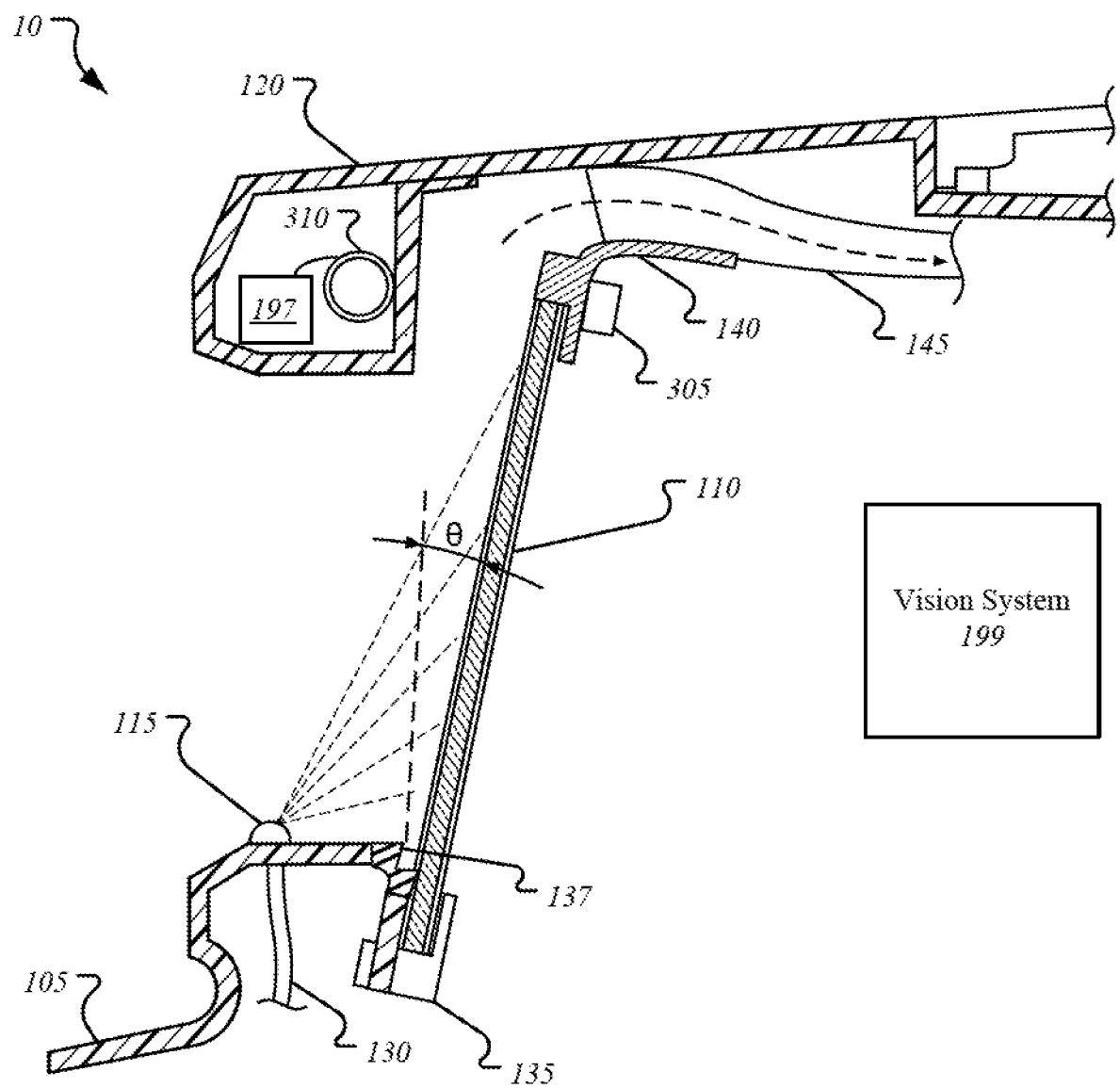
FIG. 3B is a cross-sectional view of the housing in FIG. 3A with the window tilted, according to an exemplary aspect of the present disclosure.

In an alternative aspect, as illustrated in FIGS. 3A-3B, the seal between the cover 120 and the window retainer 140 is maintained via at least one magnet 305 and at least one electromagnet 310. The at least one magnet 305 can be a permanent magnet. The at least one magnet 305 can be attached to the glass retainer 140 on a side opposite to the side in contact with the cover 120, on a side adjacent to the cover 120, molded into the glass retainer 140, or disposed in any location that promotes the glass retainer 140 to form a seal against the cover 120. The at least one magnet 305 can be attached via mechanical means, for example a pin, bolt, screw, or clamp, or attached via chemical means, for example a chemical adhesive or adhesive tape. The at least one electromagnet 310 can be disposed in a location that promotes the glass retainer 140 to form a seal against the cover 120. For example, the at least one electromagnet 310 can be disposed in a cavity of the cover 120, wherein the at least one magnet 305 will be attracted to the at least one electromagnet 310 through a thickness of the cover 120. For example, the at least one electromagnet 310 can be molded into the cover 120.

The at least one electromagnet 310 can be electrically coupled to a voltage source 197. The voltage source 197 can be any device capable of applying and maintaining a fixed voltage to the at least one electromagnet 310. For example, the voltage source 197 can be a battery. For example, the voltage source 197 can be a generator. Upon application of a voltage from the voltage source 197, the at least one electromagnet 310 can attract the at least one magnet 305. This attractive force can pill the window 110 against the cover 120 and form a seal. During the cleaning procedure, the window 110 can be tilted to promote draining of the cleaning agent and foreign material slurry. In one aspect, the applied voltage is stopped and the force of the wind from the vehicle motion or the force of the expelled gas from the at least one nozzles 115, or both, can push the window 110 back into the tilted orientation to allow for draining. In another aspect, the vehicle is parked or moving slowly such that the force of the wind from the vehicle motion is not sufficient to promote slurry movement into the drain duct 145. In this case, the polarity of the applied voltage is reversed and the at least one electromagnet 310 repels the at least one magnet 305, which repositions the window 110 into the tilted orientation, and the at least one nozzles 115 can eject gas to promote slurry movement into the drain duct 145. It can be appreciated that the locations of the at least one magnet 305 and at least one electromagnet 310 can be varied as long as the at least one electromagnet 310 can apply a force to the at least one magnet 305 such that the window 110 is moved into a tilted orientation and back.

Figure 4:
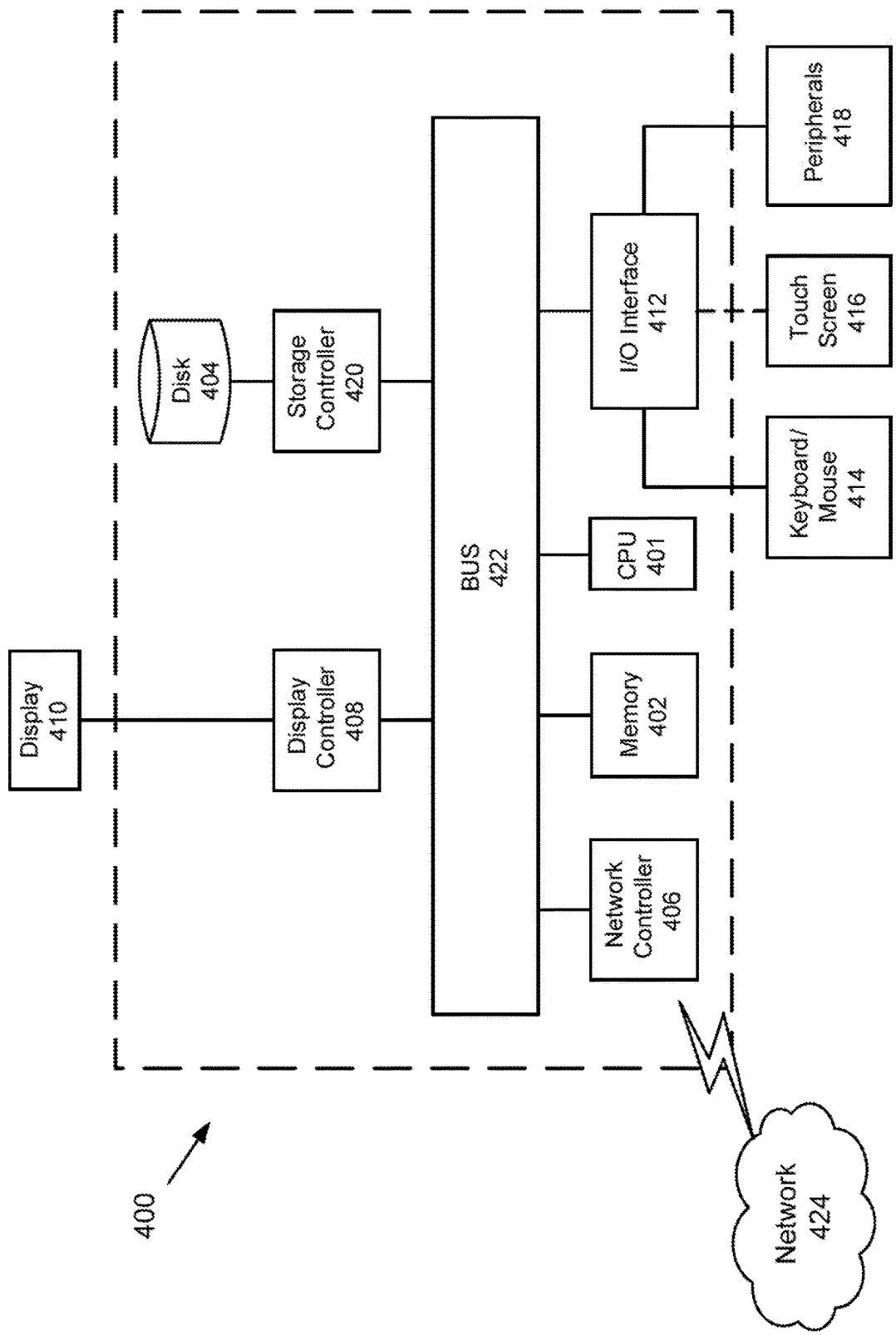
FIG. 4 is a block diagram of a hardware description of a computer according to an exemplary aspect of the present disclosure.

FIG. 4 is a block diagram of a hardware description of a computer 400 used in exemplary embodiments. In the embodiments, computer 400 can be a desk top, laptop, or server. Computer 400 could be used as the processing circuitry in the vision system 199 configured to analyze image and distance data illustrated in FIGS. 1-3.

In FIG. 4, the computer 400 includes a CPU 401 which performs the processes described herein. The process data and instructions may be stored in memory 402. These processes and instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 400 communicates, such as a server or computer.

Further, the claimed advancements may be provided as a utility application, background daemon, or component of an operating system, or combination thereof, executing in conjunction with CPU 401 and an operating system such as Microsoft® Windows®, UNIX®, Oracle® Solaris, LINUX®, Apple macOS® and other systems known to those skilled in the art.

In order to achieve the computer 400, the hardware elements may be realized by various circuitry elements, known to those skilled in the art. For example, CPU 401 may be a Xenon® or Core® processor from Intel Corporation of America or an Opteron® processor from AMD of America, or may be other processor types that would be recognized by one of ordinary skill in the art. Alternatively, the CPU 401 may be implemented on an FPGA, ASIC, PLD or using discrete logic circuits, as one of ordinary skill in the art would recognize. Further, CPU 401 may be implemented as multiple processors cooperatively working in parallel to perform the instructions of the inventive processes described above.

The computer 400 in FIG. 4 also includes a network controller 406, such as an Intel Ethernet PRO network interface card from Intel Corporation of America, for interfacing with network 424. As can be appreciated, the network 424 can be a public network, such as the Internet, or a private network such as LA N or WAN network, or any combination thereof and can also include PSTN or ISDN sub-networks. The network 424 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 400 further includes a display controller 408 such as a NVIDIA® GeForce® GTX or Quadro® graphics adaptor from NVIDIA Corporation of America for interfacing with display 410, such as a Hewlett Packard® HPL2445w LCD monitor. A general purpose interface 412 interfaces with a keyboard and/or mouse 414 as well as an optional touch screen panel 416 on or separate from display 410. General purpose I/O interface 412 also connects to a variety of peripherals 418 including printers and scanners, such as an OfficeJet® or DeskJet® from Hewlett Packard.

The general purpose storage controller 420 connects the storage medium disk 404 with communication bus 422, which may be an ISA, EISA, VESA, PCI, or similar, for interconnecting all of the components of the computer 400. A description of the general features and functionality of the display 410, keyboard and/or mouse 414, as well as the display controller 408, storage controller 420, network controller 406, and general purpose I/O interface 412 is omitted herein for brevity as these features are known.

Figure 5:
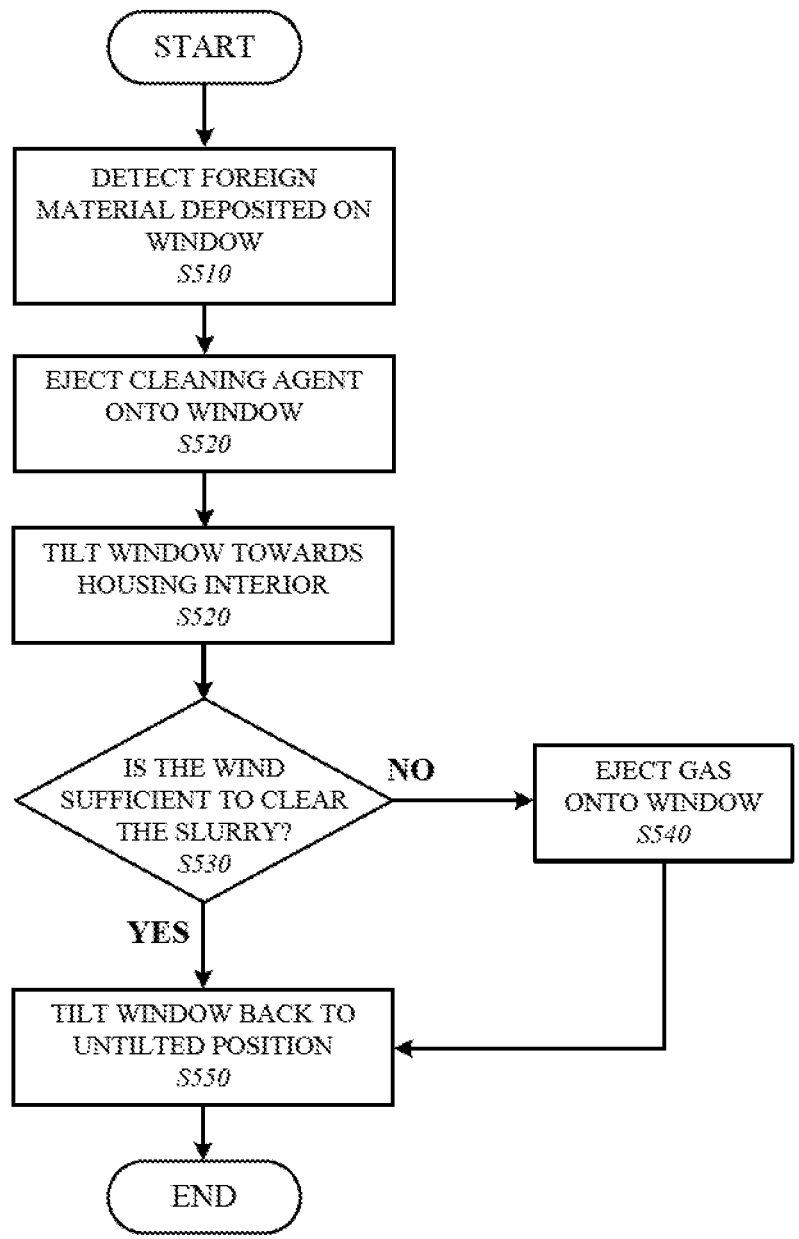
FIG. 5 is a flow chart for a method of cleaning the window, according to an exemplary aspect of the present disclosure.

FIG. 5 shows a process flow for cleaning the window 110 of the housing 100, according to an exemplary aspect of the present disclosure. As seen, the process includes step S510 of detecting a deposited foreign material on the surface of the window 110 via the on system 199. Upon said detection, a cleaning agent, such as a cleaning solution, is ejected onto the window 110 in step S520 to remove said foreign material. The slurry of cleaning agent and foreign material can be drained to the drain duct 145 via tilting the window towards the interior of the housing in step S520. As seen in step S530, the force of the wind as the vehicle is in motion can promote movement of the slurry towards the drain duct 145. It the force of the wind insufficient is in moving the slurry, gas can be ejected from the at least one spray nozzle 115 in step S540. Upon clearing the slurry, the window 110 can be tilted back to its upright, un-tilted position that forms a seal between the window 110 and the cover 120 in step S550. The process can be repeated for multiple cycles as needed to clear a fraction or all deposited foreign material on the surface of the window 110. It can be appreciated that any of the aforementioned steps can be performed in a different order than as described in order to clean the window 110. It can also be appreciated that some or all of the steps can be performed more than once or for an extended duration of time before moving onto a subsequent step in the process in order to more effectively clean the window 110.

The advantages of the disclosed vehicle glass cleaning system are summarized again as follows: the window 110, when dirty, can be sprayed with a cleaning agent and tilted to allow draining of the resulting cleaning agent and foreign material slurry. The cleaning procedure utilizes the force of the wind from the vehicle motion in a direction substantially perpendicular to the window 110 or the force of the ejected gas from the at least one nozzle 115, or both of the aforementioned forces, to promote movement of the shiny towards the drain duct 145, which enables the vision system 199 to operate continuously without introducing obstructions into its field of view. This can result in more accurate data analysis and safer navigation of the vehicle around obstacles, especially those that may present themselves unexpectedly and rapidly into the vehicle environment.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A glass cleaning system, comprising:
    a housing, including
        at least one peripheral sidewall substantially perpendicular relative to a side of a vehicle to which the housing is attached;
        a cover disposed on a side of the housing opposite the side of the vehicle to which the housing is attached; and
        a vision system including at least one sensor and processing circuitry, the vision system being disposed in an interior of the housing, the at least one sensor being communicatively coupled to the processing circuitry, and the vision system being configured to detect surrounding objects and determine distances between said objects and the vehicle;
    a window forming a first sidewall of the at least one peripheral sidewall of the housing and configured to tilt towards the interior of the housing into an angled orientation and back;
    a drain duct disposed in the interior of the housing; and
    at least one spray nozzle.

2. The glass cleaning system of claim 1, wherein the at least one sensor includes one or more of an optical camera, an infrared camera, a LIDAR unit, a radar unit, and a sonar unit.

3. The glass cleaning system of claim 1, wherein the at least one spray nozzle is configured to eject one or more of a cleaning solution, a cleaning foam, and a gas onto the window.

4. The glass cleaning system of claim 1, further comprising:
    a motor attached to the window and configured to tilt the window towards the interior of the housing into an angled orientation and back.

5. The glass cleaning system of claim 1, further comprising:
    a filtration system configured to filter at least one of a cleaning solution, a cleaning foam, and a foreign material cleaned from the window and drained to the drain duct, wherein the filtered solution is re-used as at least one of the cleaning solution and cleaning foam; and
    a reservoir fluidly connected to the filtration system and the at least one spray nozzle, the at least one of the cleaning solution and the cleaning foam being deposited in the reservoir after filtration by the filtration system.

6. The glass cleaning system of claim 1, wherein a pump is configured to pump at least one of a cleaning solution and a cleaning foam through the at least one spray nozzle.

7. The glass cleaning system of claim 6, wherein the pump is configured to pump a gas through the at least one spray nozzle.

8. The glass cleaning system of claim 1, further comprising:
    a glass retainer mounted along an edge of the window proximal to the housing and having a main body portion and an elongated arm portion, wherein:
        the elongated arm portion sits flush with the exterior of the drain duct to form a seal between the window and the drain duct; and
        the main body portion is attached to the edge of the window and forms a seal between the cover and the window when the window is not tilted towards the interior of the housing.

9. The glass cleaning system of claim 8, wherein a material of the glass retainer includes at least one of aluminum, steel, stainless steel, and titanium.

10. The glass cleaning system of claim 1, wherein the at least one spray nozzle is configured to spray in a wide sweeping pattern from an edge of the window proximal to the vehicle to the edge of the window proximal to the cover.

11. The glass cleaning system of claim 1, wherein a material of the window includes at least one of glass, polycarbonate, zinc selenide, and magnesium fluoride.

12. The glass cleaning system of claim 1, wherein a material of the housing includes at least one of aluminum, steel, polycarbonate, acrylonitrile butadiene styrene (ABS), polyethylene terephthalate, polyvinyl chloride, polypropylene, nylon, carbon fiber, glass fiber-reinforced resin, metal alloys, and other polymers, or any combination thereof.

* * * * *